United States Patent
Bowman et al.

(10) Patent No.: US 6,957,789 B2
(45) Date of Patent: Oct. 25, 2005

(54) SEAT BELT RETRACTOR

(75) Inventors: Paul Bowman, Calisle (GB); Alan George Smithson, Corby Hill (GB); George Brotherson Routledge, Carlisle (GB); David Smith, Brampton (GB); Terry Nichol, Dalston (GB)

(73) Assignee: Key Safety Systems, Inc., Sterling Heights, MI (US)

( * ) Notice: Subject to any disclaimer, the term of this patent is extended or adjusted under 35 U.S.C. 154(b) by 85 days.

(21) Appl. No.: 10/683,705

(22) Filed: Oct. 14, 2003

(65) Prior Publication Data
US 2004/0130137 A1    Jul. 8, 2004

(30) Foreign Application Priority Data
Jan. 3, 2003   (EP) .................................. 03250045

(51) Int. Cl.⁷ ............................................ B60R 22/28
(52) U.S. Cl. ................... 242/379.1; 280/805
(58) Field of Search ....................... 242/379, 379.1; 280/805, 807; 297/476, 478

(56) References Cited

U.S. PATENT DOCUMENTS

| | | |
|---|---|---|
| 5,924,641 A | 7/1999 | Miller, III et al. |
| 6,267,315 B1 * | 7/2001 | Blackadder et al. ........ 242/384 |
| 6,454,201 B1 | 9/2002 | Weller et al. |

FOREIGN PATENT DOCUMENTS

EP    0 703 124 A    3/1996

* cited by examiner

Primary Examiner—John Q. Nguyen
(74) Attorney, Agent, or Firm—Lonnie R. Drayer

(57) ABSTRACT

A U-shaped frame for a seat belt retractor has two spaced arms made from a material of a predetermined thickness and having a cutout in the material of each arm for receiving a lockbar. Each cutout has an edge comprising a land portion for supporting the lockbar, which land portion is of a reduced thickness compared to the thickness of the material of the arms, to present a reduced surface area to the lockbar. The frame may be of pressed steel and the lockbar of die-cast non-ferrous material.

17 Claims, 1 Drawing Sheet

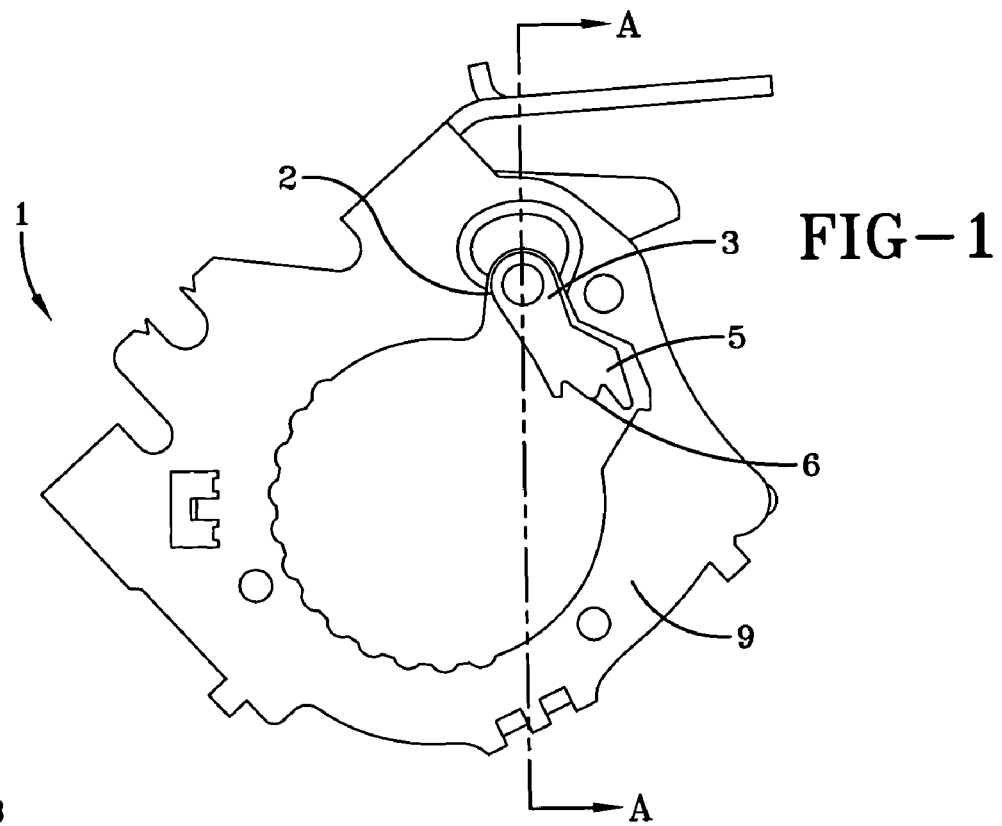
FIG-1
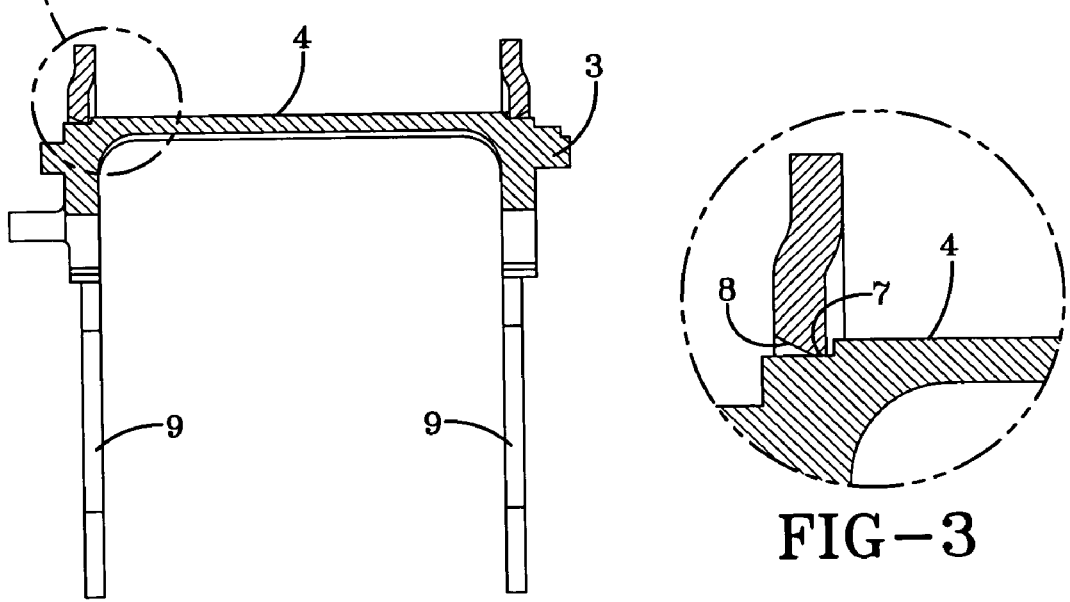
FIG-2
SECTION A-A
FIG-3

SEAT BELT RETRACTOR

FIELD OF THE INVENTION

The present invention relates to a seat belt retractor.

BACKGROUND OF THE INVENTION

A seat belt retractor traditionally comprises a pressed steel U-shaped frame within which is mounted a rotatable cylindrical spool serving as a reservoir for seat belt webbing. The spool rotates about its longitudinal axis to pay-out or wind-in seat belt webbing as required, but is biased towards a webbing wound position so as to maintain the seat belt securely across the body of a vehicle occupant without slack developing. The vehicle occupant is able to move around within limits, for example, to reach a glove compartment or radio controls. However, in a crash a sensor detects a sudden deceleration of the vehicle and locks the spool against the further payout of webbing, thus securing the vehicle occupant against forward motion and preventing impact with internal parts of the vehicle.

The spool is locked by a die cast non-ferrous lockbar mounted across the open part of the arms of the U-shaped frame. The lockbar pivots in cutouts in the frame arms, into and out of its locking position. Considerable tensile forces are transmitted to the frame during a crash and to resist premature failure of the frame due to its inherent instability, thicker material and additional cross bracing are traditionally employed in the vicinity of the relevant area.

However this extra material and cross bracing results in additional weight and cost of the frame assembly. It would be advantageous to stabilize the frame without the extra material and improve the tensile load capacity with no extra parts, weight or cost.

SUMMARY OF THE INVENTION

There is provided in accordance with one aspect of the present invention a frame for a vehicle seat belt retractor, the frame comprising two spaced arms made of a material of a predetermined thickness and each arm having a cutout therein receiving a lockbar, where each cutout has an edge comprising a land portion for supporting the lockbar, which land portion is of a reduced thickness compared to the predetermined thickness of the arms to present a reduced surface area to the lockbar.

BRIEF DESCRIPTION OF THE DRAWINGS

For a better understanding of the invention, and to show how the same may be carried into effect, reference will now be made to the accompanying drawings, in which:

FIG. 1 is a side view of a retractor frame assembly according to the present invention.

FIG. 2 is a cross section taken along line A—A in FIG. 1.

FIG. 3 is a close up of the area B of FIG. 2.

DETAILED DESCRIPTION OF THE INVENTION

FIG. 1 is a side view of one arm 9 of a U-shaped frame 1 for a seat belt retractor. As shown in FIG. 2 a second substantially identical arm of the U-shaped frame 1 is spaced apart from and parallel to the arm shown in FIG. 1. A cutout 2, that is to say an opening, is provided in the upper part of the arm 9 of the seat belt retractor frame 1 and a lockbar 3 rests in this cutout 2. The lockbar 3 comprises an elongate rod 4 passing through the cutout 2 in the arm of the frame shown and also through a corresponding cutout in the other arm of the frame 1, as shown in FIG. 2. Preferably the material of the frame 1 is pressed steel. The frame 1 may be used in a seat belt retractor with a lockbar 3 formed of die-cast non-ferrous material.

Fixed to each end of the rod 4 is a locking pawl 5 with locking teeth 6. The lockbar is pivotable in the cutouts 2 between an unengaged position as shown and a locking position in which the teeth 6 engage with teeth on a spool assembly (not shown) to prevent rotation of the spool and thus prevent the pay-out of seat belt webbing in a crash.

FIG. 2 is a cross section taken at line A—A of FIG. 1 showing the two arms 9 of the frame 1 with the lockbar 3 resting on narrow lands 7 located at the peripheries of the cutouts 2. These narrow lands 7 lie on at least a part of the edge of each cutout 2 to present a relatively sharp edge, i.e. small surface area to the rod 4 of the lockbar 3. These lands 7 generally will permanently contact the rod 4. As the load increases they will penetrate the rod 4 and the lockbar 3 will be loaded with the increasing crash forces and experiences tensile loading along its length. This effectively holds the frame arms 9 together against their natural tendency to move apart from each other under load.

FIG. 3 shows an enlarged view of the area B of FIG. 2, in which the edge of each cutout 2 has a second section 8 which tapers away from the land 7 in the region in which the lockbar 3 contacts the edge of the cutout 2.

The frame bearing second section 8 may alternatively step away from the land 7. The chamfer taper, or step, helps to prevent excessive indentation of the frame 1 into the lockbar 3 which may lead to premature failure of the lockbar 3 and thus of the retractor. This second section 8 comes into effect as the load increases and serves to reduce the contact pressure between the lockbar 3 and the frame 1. Hence the edge of each cutout 2 may be chamfered or otherwise cut-away or tapered in part.

The two spaced arms 9 of the U-shaped frame 1 each comprise a material of a predetermined thickness. The cutouts 2 in the arms 9 each have an edge comprising a land portion 7 for supporting the lockbar 3, and each said land portion has a reduced thickness compared to the predetermined thickness of the arms 9 to present a reduced surface area to the lockbar.

This invention can achieve an improvement in tensile load capacity of a seat belt retractor with no additional parts, weight or cost.

Although this invention has been described by way of example and with reference to possible embodiments thereof, it is to be understood that modifications and improvements may be made without departing from the spirit or scope of the invention.

We claim:

1. A frame for a vehicle seat belt retractor assembled with a lockbar, the frame comprising two spaced arms made of a first material of a predetermined thickness and each arm having a cutout therein receiving the lockbar, where each cutout has an edge comprising a land portion for supporting the lockbar, which land portion is of a reduced thickness compared to the predetermined thickness of the arms to present a reduced surface area to the lockbar, the lockbar comprising a second material and each land portion of the edges of the cutouts presenting a relatively sharp edge such that as a load on the seat belt retractor frame increases during a crash of a vehicle the lands will penetrate the lockbar.

2. The frame for a vehicle seat belt retractor according to claim 1 wherein the edges of the cutouts in the arms of the seat belt retractor frame further comprise a second section which tapers away from the land portion and from the cutout.

3. The frame for a vehicle seat belt retractor according to claim 2 wherein the second section steps away from the land portion and from the cutout.

4. The frame for a vehicle seat belt retractor according to claim 3 wherein the first material comprises pressed steel.

5. The frame for a vehicle seat belt retractor according to claim 4 wherein in the second material is a die-cast non-ferrous material.

6. The frame for a vehicle seat belt retractor according to claim 2 wherein the first material comprises pressed steel.

7. The frame for a vehicle seat belt retractor according to claim 6 wherein in the second material is a die-cast non-ferrous material.

8. The frame for a vehicle seat belt retractor according to claim 1 wherein in the first material comprises pressed steel.

9. The frame for a vehicle seat belt retractor according to claim 8 wherein in the second material is a die-cast non-ferrous material.

10. An assembly of a seat belt retractor frame and a lockbar, the seat belt retractor frame comprising two spaced arms made of a first material of a predetermined thickness and each arm having a cutout therein receiving a lockbar, where each cutout has an edge comprising a land portion for supporting the lockbar, which land portion is of a reduced thickness compared to the predetermined thickness of the arms to present a reduced surface area to the lockbar; and the lockbar is disposed adjacent to the land portions of the edges of the cutouts in the arms of the seat belt retractor frame and comprises a rod made of a second material and having located at each end thereof a locking pawl with locking teeth, the lockbar being pivotable in the cutouts in the arms of the seat belt retractor frame, each land portion of the edges of the cutouts presenting a relatively sharp edge such that as a load on the seat belt retractor frame increases during a crash of a vehicle the lands will penetrate the rod of the lockbar.

11. The assembly of a seat belt retractor frame and a lockbar according to claim 10 wherein the edges of the cutouts in the arms of the seat belt retractor frame further comprise a second section which tapers away from the land portion and from the lockbar.

12. The assembly of a seat belt retractor frame and a lockbar according to claim 11 wherein the second section steps away from the land portion and from the cutout.

13. The assembly of a seat belt retractor frame and a lockbar according to claim 12 wherein the first material comprises pressed steel and the second material comprises a die-cast non-ferrous material.

14. The assembly of a seat belt retractor frame and a lockbar according to claim 11 wherein the first material comprises pressed steel and the second material comprises a die-cast non-ferrous material.

15. The assembly of a seat belt retractor frame and a lockbar according to claim 10 wherein the first material comprises pressed steel and the second material comprises a die-cast non-ferrous material.

16. An assembly of a seat belt retractor frame and a lockbar, the seat belt retractor frame comprising two spaced arms made of pressed steel of a predetermined thickness and each arm having a cutout therein receiving a lockbar, where each cutout has an edge comprising a land portion for supporting the lockbar, which land portion is of a reduced thickness compared to the predetermined thickness of the arms to present a reduced surface area to the lockbar; and the lockbar comprising a die-cast non-ferrous material is disposed adjacent to the land portions of the edges of the cutouts in the arms of the seat belt retractor frame and comprising a rod having located at each end thereof a locking pawl with locking teeth, the lockbar being pivotable in the cutouts in the arms of the seat belt retractor frame, each land portion of the edges of the cutouts presenting a relatively sharp edge such that as a load on the seat belt retractor frame increases during a crash of a vehicle the lands will penetrate the rod of the lockbar.

17. The assembly of a seat belt retractor frame and a lockbar according to claim 16 wherein the relatively sharp edges presented by the land portions of the edges of the cutouts in the arms of the seat belt retractor are made sharp by a second section which tapers away from the land portion and from the lockbar.

* * * * *